United States Patent
Mayo et al.

[11] 3,904,564
[45] Sept. 9, 1975

[54] PACKAGING STABILIZER

[75] Inventors: William E. Mayo, Lunenburg, Mass.; John W. Brook, Plainfield, N.J.

[73] Assignee: M & T Chemicals Inc., Greenwich, Conn.

[22] Filed: May 20, 1971

[21] Appl. No.: 145,467

Related U.S. Application Data

[63] Continuation-in-part of Ser. No. 12,137, Feb. 17, 1970, abandoned.

[52] U.S. Cl. .......... 260/23 XA; 252/400; 260/45.85
[51] Int. Cl.² ......................................... C09K 15/00
[58] Field of Search ...... 260/23 XA, 45.85; 252/400

[56] References Cited
UNITED STATES PATENTS

| | | | |
|---|---|---|---|
| 3,417,039 | 12/1968 | Penneck | 260/23 |
| 3,479,308 | 11/1969 | Gattenby et al. | 260/23 |
| 3,492,267 | 1/1970 | Wood | 260/45.75 |
| 3,510,441 | 5/1970 | Huntzinger | 260/23 |

OTHER PUBLICATIONS

Zimmerman & Lavine, Handbook of Material Trade Names, Industrial Research Service, Dover, New Hampshire, 1953, p. 238.
Sarvetnick, Polyvinyl Chloride, Reinhold Plastics Applications Series, Van Nostrand Reinhold Company, New York, New York Apr. 1, 1969 pp. 67–71.
Chevassus et al., The Stabilization of Polyvinyl Chloride, St. Martin's Press Inc. New York, New York 1963 pp. 57, 58, 67, 68, 69, 112 & 144.

*Primary Examiner*—Ronald W. Griffin
*Attorney, Agent, or Firm*—Robert P. Auber; Kenneth G. Wheeless; Robert Spector

[57] ABSTRACT

This invention relates to stabilizer compositions, to stabilized halogenated vinyl resins and to the process for preparing halogen-containing vinyl resin compositions stabilized against the deteriorative effects of heat by adding to a halogen-containing vinyl resin an effective amount of a stabilizer comprising a solution of calcium ethyl acetoacetate in glycerol monoricinoleate, optionally in a combination with other known stabilizers that preferably includes N,N-diphenylthiourea and a zinc salt of an aromatic or high molecular weight aliphatic carboxylic acid.

6 Claims, No Drawings

PACKAGING STABILIZER

This application is a continuation-in-part of application Ser. No. 12,137, filed Feb. 17, 1970, now abandoned.

BACKGROUND OF THE INVENTION

This invention relates to novel, non-toxic stabilizers for halogen-containing vinyl polymers and to novel halogen-containing polymeric resin compositions that are stabilized against the deteriorative effects of heat and which are suitable for use as transparent food packaging materials.

Halogen-containing resins, particularly homopolymers and copolymers of vinyl chloride or vinylidene chloride, have found wide use as packaging materials for various consumer items, including foodstuffs. Typically, these packaging materials are employed as colorless, transparent films. It is essential that such films do not become discolored or blackened during their manufacture or processing, since this would lead to an unattractive package. It is also essential that the film not become brittle, cracked, blistered or spotted with age since this would lead to a loss of the protection which the film affords the packaged item.

During the manufacture of packaging materials, including those comprising halogen-containing vinyl polymers, the resin may be subjected to heat, e.g. during blending, milling, pressing or other shaping operations. The finished package may also be heated as in a heat-sealing operation or under novel conditions of handling. Halogen-containing vinyl polymers are characterized by their instability in the presence of heat. Specifically, polymers of vinyl chloride or vinylidene chloride may discolor, crack, blister or otherwise degrade in a manner which renders them unsuitable for use as a packaging material.

In order to avoid these deficiencies, it is common practice to blend with the halogen-containing polymer a stabilizer which is capable of reducing the discoloration or degradation of the polymer. Organotin compounds, typified by dibutyltin maleate, have proved to be exceptionally effective in preventing such degradation. However, commercially available organotin compounds are often too toxic to be employed in certain areas of packaging.

A number of metal soaps, including those of calcium and zinc, have been employed as stabilizers. The heat stabilization imparted by these materials is relatively low, and their use has heretofore been limited primarily to those applications requiring a complete absence of toxicity and/or minimal stabilization. Food packaging film and bottles incorporating these stabilizers must be processed at relatively slow speeds, since the resin compositions will not withstand the elevated temperatures required for a high-speed production operation without exhibiting some evidence of degradation due to heat. In addition, when the calcium and/or zinc soaps are employed at concentrations above about 1.5% by weight of resin, the levels of haziness and yellowness become objectionable.

Calcium complexes of β-dicarbonyl compounds, e.g. calcium alkyl acetoacetates, are relatively nontoxic and substantially increase the heat stability of halogenated vinyl polymers; however, these stabilizers are not completely compatible with the polymers. The resultant haziness renders films of the polymers unsuitable for use in many food wrapping applications which require clear, colorless materials.

It is an object of this invention to provide effective, non-toxic stabilizers which do not adversely affect the physical or optical properties of polymer compositions into which these stabilizers are incorporated.

It is also an object of the present invention to provide novel and superior liquid stabilizer compositions for chlorine-containing vinyl polymers, particularly polyvinyl chloride and copolymers of vinyl chloride, which are compatible with said polymers and with other stabilizers, plasticizers and impact modifiers normally added thereto during production of rigid or flexible polymer compositions.

It is a further object of this invention to provide novel stabilized halogen-containing vinyl polymer compositions suitable for use as food packaging materials.

Surprisingly it has been found that the haziness which up until now has characterized polymer compositions containing calcium ethyl acetoacetate as a major stabilizer component can be removed and the heat stability of the polymer substantially increased by forming a homogeneous mixture of calcium ethyl acetoacetate and glycerol monoricinoleate and blending the resulting mixture, which is a semi-solid at room temperature into the polymer composition.

SUMMARY OF THE INVENTION

One aspect of this invention concerns novel stabilizer compositions for halogen-containing vinyl resins, wherein said stabilizer is comprised at least in part of a homogeneous mixture containing calcium ethyl acetoacetate and glycerol monoricinoleate wherein the weight ratio of the two components is between about 1:1 and 1:2, respectively.

Another aspect of this invention concerns a stabilizer composition comprising a homogenous semisolid or liquid mixture containing calcium ethyl acetoacetate dissolved in glycerol monoricinoleate and solid phase comprised at least in part of N,N-diaryl thiourea in combination with one or more zinc salts of carboxylic acids selected from the group consisting of aliphatic acids containing not less than about 10 carbon atoms and aromatic acids.

Yet another aspect of this invention concerns novel stabilized, halogen-containing vinyl polymer compositions suitable for use as transparent food wrapping, the stabilizer for said polymer being comprised at least in part of calcium ethyl acetoacetate which is solubilized in glycerol monoricinoleate, wherein said stabilizer comprises between about 0.01 and two percent by weight of the polymer composition.

This invention also concerns a method for preparing stabilized halogen-containing vinyl resin compositions. In accordance with this method, one part by weight of calcium ethyl acetoacetate is solubilized in up to two parts of glycerol monoricinoleate, which may also contain additional known liquid stabilizers for halogen-containing vinyl resins. The resultant stabilizer composition is then blended into the resin, optionally in combination with one or more solid stabilizers which preferably includes a N,N-diarylthiourea in combination with a zinc salt of a high molecular weight carboxylic acid.

DETAILED DESCRIPTION OF THE INVENTION

The novel stabilizer compositions of this invention are conveniently prepared by combining one part by weight of calcium ethyl acetoacetate with up to two parts by weight of glycerol monoricinoleate. These proportions should provide a solution of workable viscosity. These ingredients are then blended together until a homogenous fluid mixture is obtained. The blending operation is preferably carried out at temperatures between about 80° – 110°C. to reduce the viscosity of the resultant liquid. The mixture is a semi-solid paste at ambient temperature. The solubilized calcium ethyl acetoacetate is then incorporated into a halogenated vinyl resin using known techniques, e.g. milling. The polymer compositions preferably contain between about 0.01 and one percent by weight of calcium ethyl acetoacetate.

By incorporating the novel stabilizer compositions of this invention into halogenated vinyl resin compositions in combination with a known solid, non-toxic heat stabilizers, it is possible to impart the excellent heat stabilization of calcium ethyl acetoacetate with adversely affecting to any significant extent the transparency or other desirable properties of films prepared from the resin. In addition, the stabilized resin compositions will withstand the high temperature required to attain commercially feasible production rates for films, containers and other shaped articles.

The efficacy and/or processability of the stabilizer compositions of this invention can be improved by including other compatible stabilizers and processing aids in addition to calcium ethyl acetoacetate. Epoxidized oils, e.g. soybean oil, are particularly preferred since in addition to increasing stabilizer effectiveness these compounds also act as processing aids by reducing the viscosity of the calcium ethyl acetoacetate-glycerol monoricinoleate mixture. Epoxidized linseed oil is also effective, as are organic phosphites, e.g. tris(-nonylphenyl) phosphite. Depending upon the type employed, the auxiliary stabilizers and processing aids preferably constitute between about 0.01 and 15 percent by weight of the stabilized polymer composition.

When the resin compositions are heated to about 200°C., the interval of time between initial heating and the first observable discoloration is increased by as much as ten minutes by the addition of between about 0.01 and 0.5 percent, based on resin weight, of a N,N-diarylthiourea, e.g. N,N-diphenylthiourea, in combination with a zinc salt of suitable aliphatic or aromatic carboxylic acids. This combination appears to be synergistic, since the desirable delay in initial color development is not observed when either the zinc compound or the thiourea is omitted from the stabilizer composition. In addition, the long-term heat stability exceeds that obtained using either component alone.

Examples of suitable zinc salts are zinc palmitate, zinc neodecanoate, zinc stearate, zinc oleate, zinc ricinoleate, zinc benzoate, and zinc salicylate.

Typical examples of other solid, non-toxic stabilizers which can be employed either singly or in combination together with the calcium ethyl acetoacetate-glycerol monoricinoleate mixture include: calcium salts such as calcium stearate, calcium oleate, calcium salts of mixed fatty acids, calcium ricinoleate, calcium benzoate and calcium salicylate. The corresponding magnesium salts are also useful stabilizers. The combination of zinc, calcium, and magnesium salts preferably should not exceed about 40% by weight of the stabilizer composition.

Other useful non-toxic stabilizers include: polyols and their monoesters such as glycerol monostearate, glycerol monooleate, glycerol monolaurate, glycerol and pentaerythritol; Orthoesters, such as those disclosed in British Patent No. 1,110,958; Non-toxic poly(vinyl chloride) stabilizers listed in "The Stabilization of Polyvinyl Chloride" by Chevassus, St. Martin's Press, New York, c. 1963.

Other stabilizers suitable for use in this invention include thiodipropionic acid and hindered phenols of the formula

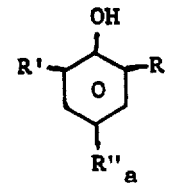

wherein R' is a branched alkyl radical containing less than 10 carbon atoms and R'' is an alkyl radical containing less than 10 carbon atoms, and $a$ is a number 0 or 1.

The polymers or resins which may be stabilized by practice of this invention may be halogen-containing organic polymers typically those which contain chlorine atoms bonded to the polymer chain. These polymers may be homopolymers including polyvinyl chloride-type polymers, e.g. polyvinyl chloride, polyvinylidene chloride, etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. For convenience, reference will be hereinafter made to vinyl chloride polymers.

The polymers may be either "rigid" or "flexible". When rigid polymers are employed, they may include impact modifiers, pigments and/or fillers, lubricants, etc., in addition to the resin and stabilizer. When flexible polymers are employed, they may include plasticizer (primary and secondary), pigments and/or fillers, lubricants, etc. in addition to the resin and stabilizer.

In general, the synthetic resins which can be stabilized according to this invention include the following polymers which may or may not be mixed with other stabilizers, additives, flameproofing agents, dyes, pigments, etc.:

a. Homopolymer of vinyl chloride,
b. Homopolymer of vinylidene chloride,
c. Copolymers of vinyl chloride and acrylonitrile,
d. Copolymers of vinylidene chloride and acrylonitrile,
e. Copolymers of vinylidene chloride, acrylonitrile and N-isopropylacrylamide,
f. Copolymers of vinyl chloride and vinyl acetate,
g. Copolymers of vinyl chloride, acrylonitrile and N-butyrylacrylamide,
h. Copolymers of vinyl chloride, methyl methacrylate and vinyl acetate, i. Copolymers of vinyl chloride or vinylidene chloride with acrylonitrile and N-vinylpyridine,
j. Copolymers of vinyl chloride or vinylidene chloride with acrylonitrile mixed with a homopolymer of an N-alkylacrylamide (e.g. N-isopropylacrylamide, N-octylacrylamide, etc.),
k. Copolymers of vinyl chloride or vinylidene chloride with acrylonitrile mixed with a homopolymer or copolymer of α-vinylpyrrolidone,
l. Copolymers of vinyl chloride or vinylidene chloride with acrylonitrile mixed with copolymers of an N-alkylacrylamide and acrylonitrile,
m. Other copolymers and mixtures of homopolymers or copolymers of vinyl chloride and/or vinylidene chloride with or without other monoolefinically unsaturated polymerizable monomers containing from 2 to 20 or more carbon atoms, especially those containing from 2 to 8 carbon atoms and no more than one nitrogen atom and no more than 2 oxygen atoms.

The methods for preparing the synthetic resins described above are well known and such methods and a great variety of such synthetic resins are described in the prior art.

It is a feature of the novel stabilizer systems of this invention that they permit attainment of stabilized halogen-containing polymers and resins, particularly vinyl halide polymers such as vinyl chloride, characterized by their resistance to the deteriorative effect of heat and the clarity of films prepared from these materials. The degrees of stabilization attained in such systems may be considerably in excess of that previously attainable by any prior art non-toxic stabilizer system.

Because of the outstanding properties of this novel stabilizer system, it is possible to effect stabilization with lower concentrations of stabilizer and thereby to obtain a more effective system on a cost-performance basis.

In order to illustrate clearly the novel features of this invention and to illustrate the unexpected and outstanding results which may be attained by practice of this invention, the following illustrative examples may be set forth wherein all parts are parts by weight unless otherwise indicated.

The mixture of calcium ethyl acetoacetate and glycerol monoricinoleate was prepared by heating the glycerol monoricinoleate to between 80°–100°C., adding the calcium compound with stirring and continuing to heat until a homogeneous solution was obtained.

The polymer compositions were thoroughly blended by placing the mixture of poly(vinyl chloride) and stabilizer on a two-roller differential mill which was oil-heated to a temperature of 175°C. and milling for about 5 minutes. A continuous band of the composition formed around one of the rollers. This band was cut and the composition removed from the hot roller as a continuous sheet. Squares of this material measuring 2.54 cm × 2.54 cm were cut for heat stability testing.

For the heat stability test, the squares were placed in an air oven regulated to maintain a temperature of 205°C. Samples of each composition were removed from the oven at 10 minute intervals and were rated visually against an illuminated background as to color change and degradation in accordance with the Gardner color scale (ASTM test No. D-1544-68) using glass discs as color standards. In addition to the ratings of 1 through 18, two additional values were added for purposes of the present test. The additional values are:

19 — color between 18 and black
20 — black

The poly(vinyl chloride) compositions into which the stabilizers were incorporated was prepared by combining 100 parts (1800 grams) of a polyvinyl chloride homopolymer resin [sold as Borden PVC 47-B] with 27 parts (486 grams) of dioctyl adipate, 9 parts (162 grams) of epoxidized soybean oil, 3 parts (54 grams) of sorbitan monolaurate antifog agent, 0.0035 parts (0.063 grams) of Food, Drug, and Cosmetic Lake Pigment Violet No. 1 and 0.0005 parts (0.009 grams) of Food, Drug, and Cosmetic Lake Pigment Blue No. 1.

The following stabilizer compositions were evaluated:

EXAMPLE 1 — Control 0.33 parts calcium ethyl acetoacetate (per 100 parts of polymer)

EXAMPLE 2 — Control 0.33 parts calcium ethyl acetoacetate and 0.45 parts glycerol monoricinoleate added to resin individually, not as a homogenous mixture.

EXAMPLE 3

0.33 parts calcium ethyl acetoacetate and 0.45 parts glycerol monoricinoleate combined to form a homogenous solution prior to addition to resin.

EXAMPLE 4

Same as Example 3, except that amount of stabilizer was doubled.

EXAMPLE 5 — Control

The solution of Example 3 and 0.01 parts of N,N-diphenylthiourea.

EXAMPLE 6 — Control

The solution of Example 3 and 0.3 parts of N,N-diphenylthiourea.

EXAMPLE 7 — Control 0.01 parts N,N-diphenylthiourea

EXAMPLE 8 — Control 0.78 parts N,N-diphenylthiourea.

EXAMPLE 9

The solution of Example 3 and 0.2 parts of zinc stearate.

EXAMPLE 10

The stabilizer of Example 9 and 0.05 parts of N,N-diphenylthiourea.

EXAMPLE 11

The stabilizer of Example 9 and 0.1 part magnesium stearate, 0.1 parts thiodipropionic acid and 0.05 parts 2,6-di-t-butyl-p-cresol.

EXAMPLE 12

The stabilizer composition of Example 11 and 0.05 parts N,N-diphenylthiourea.

Table I lists the Gardner color values of the initial sample and the values observed following 60 minutes of heating. The values observed at each of the ten minute intervals up to 30 minutes were averaged together with the initial reading and the result reported as the "Cumulative Heat Stability" (C.H.S.).

The time at which the first evidence of discoloration appeared (Gardner color of one or greater) was also recorded. A value of 0 minutes indicates that the polymer was already discolored prior to the heat stability evaluation.

Table I also includes a clarity rating for the polymer compositions. The samples employed for this rating were 0.10 cm. — thick films prepared by hot pressing the polymer composition for five minutes at a temperature of 178°C. under a pressure of 2000 p.s.i. (14.6 × $10^4$ g/cm$^2$).

TABLE I

| EXAMPLE NO. | CLARITY OF FILM | COLOR OF SAMPLE (GARDNER SCALE) INITIAL | COLOR OF SAMPLE (GARDNER SCALE) AFTER 60 MINS. | C.H.S. VALUE | INITIAL DISCOLORATION (MINUTES) |
|---|---|---|---|---|---|
| 1 | — | 2 | 16 | 8 | 0 |
| 2 | hazy | 1 | 17 | 7 | 0 |
| 3 | clear | 1 | 14 | 6 | 0 |
| 4 | — | 2 | 17 | 7 | 0 |
| 5 | — | 1 | 18 | 6 | 0 |
| 6 | — | 0 | 20 | 5 | 20 |
| 7 | — | 0 | 20 | 6 | 20 |
| 8 | — | 0 | 17 | 5 | 10 |
| 9 | — | 1 | 13 | 3 | 0 |
| 10 | — | 0 | 9 | 3 | 10 |
| 11 | — | 0 | 5 | 2 | 10 |
| 12 | — | 0 | 5 | 1 | 20 |

The following conclusions are evident from the data presented in Table I.

1. A solution of calcium ethyl acetoacetate in glycerol monoricinoleate (Example 3) provides superior heat stabilization than either the calcium compound alone (Example 1) or both ingredients when added separately to the polymer composition (Example 2).

the solution of calcium ethyl acetoacetate in glycerol monoricinoleate (Examples 5 and 6) provides little, if any, improvement in heat stability when compared against either the solution (Example 3) or the thiourea (Examples 7 and 8) alone.

3. Addition of N,N-diphenylthiourea to a polymer composition containing both the calcium ethyl acetoacetate-glycerol monoricinoleate solution and a zinc salt of a carboxylic acid (Examples 10 and 12) results in a substantial improvement in both long and short term heat stability. The improvement is unexpected based on the poor long-term stability observed using the thiourea alone (Examples 7 and 8).

Although this invention has been illustrated by reference to specific examples, changes therein which clearly fall within the scope of the invention will be apparent to those skilled in the art. It is, therefore, to be limited solely by the scope of the appended claims.

What is claimed is:

1. A stabilizer composition for vinyl chloride polymers which comprises a solution of calcium ethyl acetoacetate in glycerol monoricinoleate, the weight ratio of calcium ethyl acetoacetate to glycerol monoricinoleate being between about 1:1 and 1:2.

2. The stabilizer of claim 1 which comprises, in addition to said solution of calcium ethyl acetate, a solid phase wherein the sole or major component is a combination of a zinc salt of an aliphatic carboxylic acid containing between 10 and 20 carbon atoms with N,N-diphenylthiourea, said solid phase comprising up to about 40 per cent by weight of the total stabilizer.

3. A vinyl chloride polymer composition stabilized against the deteriorative effect of heat comprising a vinyl chloride polymer and between 0.01 and 15 per cent by weight, based on said composition, of a stabilizer comprising a 33⅓% to 50% by weight solution of calcium ethyl acetoacetate in glycerol monoricinoleate.

4. The vinyl chloride polymer composition of claim 3 wherein the stabilizer comprises between 0.01 and 2 per cent by weight of the composition.

5. The vinyl chloride polymer composition of claim 3 wherein the stabilizer comprises, in addition to said solution of calcium ethyl acetate, a solid phase wherein the sole or major component is a combination of a zinc salt of an aliphatic carboxylic acid containing between 10 and 20 carbon atoms with N,N-di-phenylthiourea, said solid phase comprising up to about 40 per cent by weight of the total stabilizer.

6. The vinyl chloride polymer composition of claim 5 wherein the stabilizer also comprises at least one auxiliary stabilizer selected from the group consisting of the calcium and magnesium salts of stearic, oleic, ricinoleic, benzoic, salicylic, and mixed fatty acids, epoxidized oils, thiodipropionic acid and hindered phenols, the total concentration of said auxiliary stabilizers being between 0.01 and 15 per cent by weight of the vinyl chloride polymer composition.

* * * * *